(12) United States Patent
Fujiwara et al.

(10) Patent No.: US 10,473,856 B2
(45) Date of Patent: Nov. 12, 2019

(54) OPTICAL BRANCHING/COUPLING DEVICE AND OPTICAL TRANSMISSION/RECEPTION MODULE

(71) Applicants: ADAMANT NAMIKI PRECISION JEWEL CO., LTD., Tokyo (JP); DENSO CORPORATION, Kariya-shi, Aichi (JP)

(72) Inventors: Hiroyuki Fujiwara, Kawaguchi (JP); Masaru Sasaki, Kawaguchi (JP); Kaoru Torii, Tokyo (JP); Ren Watanabe, Toda (JP); Tadahisa Iikubo, Kawaguchi (JP); Mitsuhiko Mizuno, Kasugai (JP)

(73) Assignees: ADAMANT NAMIKI PRECISION JEWEL CO., LTD., Tokyo (JP); DENSO CORPORATION, Kariya-shi, Aichi (JP)

( * ) Notice: Subject to any disclaimer, the term of this patent is extended or adjusted under 35 U.S.C. 154(b) by 0 days.

(21) Appl. No.: 16/081,277

(22) PCT Filed: Mar. 8, 2017

(86) PCT No.: PCT/JP2017/009345
§ 371 (c)(1),
(2) Date: Aug. 30, 2018

(87) PCT Pub. No.: WO2017/155007
PCT Pub. Date: Sep. 14, 2017

(65) Prior Publication Data
US 2019/0079244 A1    Mar. 14, 2019

(30) Foreign Application Priority Data
Mar. 9, 2016 (JP) .................... 2016-045209

(51) Int. Cl.
*G02B 6/125* (2006.01)
*G02B 6/42* (2006.01)
(Continued)

(52) U.S. Cl.
CPC .......... *G02B 6/125* (2013.01); *G02B 6/03616* (2013.01); *G02B 6/12* (2013.01);
(Continued)

(58) Field of Classification Search
CPC .......... G02B 6/125; G02B 2006/12147; G02B 2006/1215
See application file for complete search history.

(56) References Cited

U.S. PATENT DOCUMENTS

| | | | | |
|---|---|---|---|---|
| 5,408,567 A | * | 4/1995 | Hamilton | ................. G02B 6/43 385/129 |
| 7,400,801 B1 | * | 7/2008 | Tong | .................... G02B 6/1228 385/14 |

(Continued)

FOREIGN PATENT DOCUMENTS

| | | |
|---|---|---|
| JP | 2010-008787 A | 1/2010 |
| JP | 2010-032582 A | 2/2010 |

(Continued)

OTHER PUBLICATIONS

PCT/ISA/210, "International Search Report for International Application No. PCT/JP2017/009345," dated Jun. 6, 2017.

*Primary Examiner* — Omar R Rojas
(74) *Attorney, Agent, or Firm* — Manabu Kanesaka (57) ABSTRACT

Provided is an optical branching/coupling device in which optical transmission quality is improved by preventing a reduction in optical transmission quality, the reduction being due, for example, to an optical waveguide core affecting a light of another optical waveguide core in the vicinity of a joining section of the two optical waveguide cores. This (Continued)

optical branching/coupling device includes: a first optical waveguide that is provided extending from one end side to other end side; a second optical waveguide that is provided extending on a separate route from the one end side to the other end side, the other end side of the second optical waveguide being joined to the other end side of the first optical waveguide; and a cladding layer that covers the periphery of the first optical waveguide and the second optical waveguide, wherein the first and second optical waveguides comprise a cured product of a photocuring resin.

10 Claims, 5 Drawing Sheets

(51) Int. Cl.
*G02B 6/12* (2006.01)
*G02B 6/28* (2006.01)
*G02B 6/036* (2006.01)
*G02B 6/13* (2006.01)

(52) U.S. Cl.
CPC .................. *G02B 6/13* (2013.01); *G02B 6/28* (2013.01); *G02B 6/42* (2013.01); *G02B 6/4204* (2013.01); *G02B 2006/1215* (2013.01)

(56) References Cited

U.S. PATENT DOCUMENTS

2008/0267564 A1* 10/2008 Han .................. G02B 6/12004
385/45
2009/0285532 A1 11/2009 Kagami et al.

FOREIGN PATENT DOCUMENTS

| JP | 2010-032584 A | 2/2010 |
| JP | 2013-045028 A | 3/2013 |
| WO | 2007/029717 A1 | 3/2007 |

* cited by examiner

OPTICAL BRANCHING/COUPLING DEVICE AND OPTICAL TRANSMISSION/RECEPTION MODULE

RELATED APPLICATIONS

The present application is National Phase of International Application No. PCT/JP2017/009345 filed Mar. 8, 2017, and claims priority from Japanese Application No. 2016-045209, filed Mar. 9, 2016, the disclosure of which is hereby incorporated by reference herein in its entirety.

TECHNICAL FIELD

The present invention relates to an optical branching/coupling device and an optical transmission/reception module that can be used as an optical branching device, an optical coupler, or the like.

BACKGROUND ART

Conventionally, this type of invention includes an optical module provided with a hollow housing, three optical fibers connected to wall surfaces of the housing, an optical filter (a half mirror, a WDM filter or the like) supported in the housing, and a cured product of a photocuring resin filling the housing, as described in Patent Literature 1.

In the method for manufacturing the optical module, the photocuring resin in the housing is cured by the light irradiated from the optical fiber to form three cores on both sides of the optical filter. Such manufacturing techniques are referred to as self-forming waveguide technique. Thereafter, a clad made of a material having a smaller refractive index than these cores is formed so as to cover the three cores.

Another conventional technique includes the formation of a filterless branch structure by self-forming waveguide technology, as described in Patent Literature 2, for example. In this conventional technique, it is mentioned that the angle of the two branched optical waveguide cores is limited to 10 degrees to 30 degrees inclusive, whereby the difficulty of optical axis alignment at the time of designing and manufacturing is eliminated and increase of optical loss can be suppressed.

CITATION LIST

Patent Literature

Patent Literature 1: JP 2010-32582 A
Patent Literature 2: JP 2010-8787 A

SUMMARY OF INVENTION

Technical Problem

However, in the former conventional technology, since the optical filter such as a half mirror or a WDM filter is included, the structure in the housing becomes complicated and the structure becomes comparatively expensive.

In the latter conventional technology, the two branched optical waveguide cores must be set at a specific angle, and there is a possibility that the device may be enlarged in a direction crossing the optical axis.

Also, in any of the conventional techniques described above, due to the fact that the light of one optical waveguide core is affected by the other optical waveguide core in the vicinity of the junction of the two optical waveguide cores, or the like, there is a fear that the optical transmission quality may decrease.

Solution to Problem

In view of such a problem, an optical branching/coupling device of the present invention includes: a first optical waveguide extending from one end side to the other end side; a second optical waveguide extending from said one end side to said other end side through another path so that an end on the other end side of the second optical waveguide is joined to an end on the other end side of the first optical waveguide; and a cladding layer covering peripheries of the first optical waveguide and the second optical waveguide, wherein the first and second optical waveguides are cured products of a same photocuring resin.

In a second aspect of the present invention, an optical branching/coupling device includes: a first optical waveguide extending from one end side to the other end side; a second optical waveguide extending from said one end side to said other end side through another path so that an end on the other end side of the second optical waveguide is joined to an end on the other end side of the first optical waveguide; and a cladding layer covering peripheries of the first optical waveguide and the second optical waveguide, wherein the first optical waveguide is a cured product of a first photocuring resin, the second optical waveguide is a cured product of a second photocuring resin different from the first photocuring resin, a refractive index of the second optical waveguide is smaller than a refractive index of the first optical waveguide, and a refractive index of the cladding layer is smaller than the refractive index of the second optical waveguide.

Advantageous Effects of Invention

By using the basic structure described above, the optical branching/coupling device of the present invention can create the optical waveguide by itself by inputting light at the time of manufacturing. Further, the waveguide can be connected by self-alignment to a plurality of optical axes that are not in the same straight line. In addition, the optical branching/coupling device can be configured without using optical parts such as filters and lenses.

In other words, by having such a structure, an optical branching/coupling device with improved optical transmission quality can be manufactured by a self-forming waveguide technique according to the present invention.

Further, in the optical branching/coupling device of the second aspect, the optical transmission quality can be further improved.

DESCRIPTION OF EMBODIMENTS

Embodiments of the present invention will be described below with reference to the drawings. Hereinafter, the same reference numerals in different drawings denote the same parts, and redundant description are omitted as appropriate.

Figure 1:
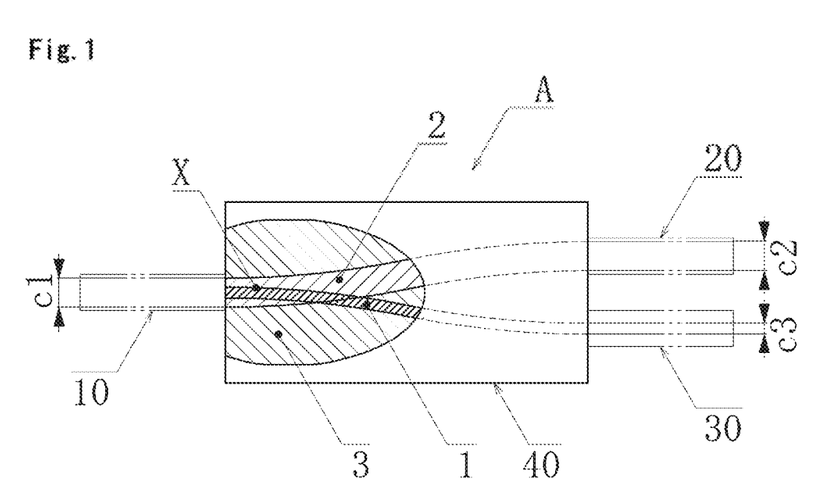
FIG. 1 is a side view showing an example of an optical branching/coupling device according to the present invention, and shows a cross section of essential parts with cutting-off.

FIG. 1 shows an example of an optical branching/coupling device according to the present invention.

This optical branching/coupling device A includes a first optical waveguide 1 extending from one end side (right end side in FIG. 1) to the other end side (left end side in FIG. 1), a second optical waveguide 2 extending from the same one end side to the other end side through another path and having an end on the other end side joined to an end on the other end side of the first optical waveguide 1, and a cladding layer 3 covering the periphery of cores constituted by the first optical waveguide 1 and the second optical waveguide 2.

In FIG. 1, a two-dot chain line indicates a first port 10, second port 20, and third port 30 used to manufacture the optical branching/coupling device A.

The first optical waveguide 1 and the second optical waveguide 2 are cured products of a photocuring resin. The second optical waveguide 2 can be composed of a cured product of a second photocuring resin different from a first photocuring resin. The cladding layer 3 can be composed of a cured product of a third photocuring resin different from the first photocuring resin and the second photocuring resin. A material having a refractive index lower than that of the second photocuring resin such as a thermosetting resin can be used for the cladding layer 3.

The second optical waveguide 2 is not necessarily a cured product of the second photocuring resin different from the first photocuring resin, and has only to be a photocured product. In manufacturing the optical branching/coupling device of the present invention in which the first optical waveguide 1 and the second optical waveguide 2 are made of a cured product of a photocuring resin, an optical waveguide can be created by itself by inputting light. Further, the waveguide can be connected by self-alignment to a plurality of optical axes which are not in the same straight line. In addition, the optical branching/coupling device can be configured without using optical components such as filters and lenses.

The first and second photocuring resins may be photocuring resins that are cured by light having a wavelength of 400 nm to 500 nm for example, and that are used for general self-forming waveguide technique.

The cladding layer 3 may be made of a material having a refractive index lower than that of the second photocuring resin, such as a photocuring resin which is cured by irradiation with ultraviolet light.

The first photocuring resin, the second photocuring resin and the third photocuring resin can be appropriately selected from, for example, the photocuring resins described in Patent Literatures 1 and 2 and other well-known photocuring resins.

The refractive index $n_2$ of the second optical waveguide 2 is made smaller than the refractive index $n_1$ of the first optical waveguide 1 by using different materials for the photocuring resin, and further, the refractive index $n_3$ of the cladding layer 3 is smaller than the refractive indices $n_1$ and $n_2$ of the first optical waveguide 1 and the second optical waveguide 2.

Such a setting of the refractive indices provides, in the first optical waveguide 1, the function of confining the light in the first optical waveguide 1 with respect to the second optical waveguide 2. Therefore, for example, when light is transmitted from the third port 30 to the first port 10 through the first optical waveguide 1, light is less leaked to the second optical waveguide 2, and thus an optical transmission with low loss and high quality becomes possible.

In a preferable example of the present embodiment, the ratio of the refractive indices has a relationship of the following mathematical equation.

$$n_1 : n_2 : n_3 = \text{about } 1.54 : \text{about } 1.52 : \text{about } 1.45$$

The numerical apertures (NA) between the first optical waveguide 1 and the second optical waveguide 2, between the first optical waveguide 1 and the cladding layer 3, and between the second optical waveguide 2 and the cladding layer 3 are referred to as $NA_{12}$, $NA_{13}$, and $NA_{23}$, respectively, and can be calculated by the following equations.

$$NA_{12} = (n_1^2 - n_2^2)^{1/2}$$

$$NA_{13} = (n_1^2 - n_3^2)^{1/2}$$

$$NA_{23} = (n_2^2 - n_3^2)^{1/2}$$

In a preferable example of the present embodiment, the relationship of the following mathematical equation is established.

$$NA_{13} > NA_{23} > NA_{12}$$

The outer diameter of the first optical waveguide 1 is set to be smaller than the outer diameter of the second optical waveguide 2.

When the outer diameters of the optical waveguides are set in this manner, for example, in the case that light is transmitted from the first port 10 side to the second port 20 side through the thicker second optical waveguide 2, light loss due to light passing to the first optical waveguide 1 which is narrower, can be reduced.

The first optical waveguide 1 and the second optical waveguide 2 have a joining portion x on the other end side (the left end side in the figure) and are formed in a substantially Y-shape or a substantially V-shape having a branched shape on the opposite side thereof.

Figure 2:
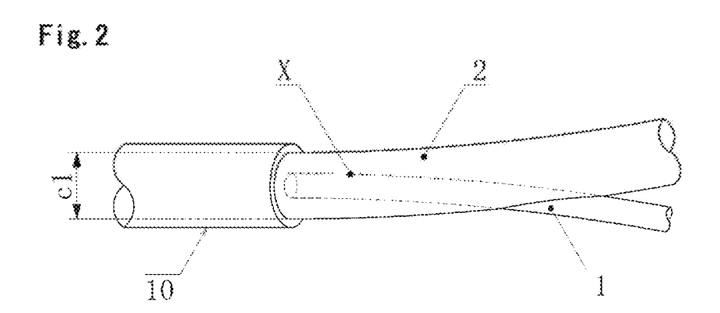
FIG. 2 is a perspective view showing a schematic structure of a joining portion between first and second optical waveguides and a first port, and a cladding layer is not shown.

In the joining portion x, the first optical waveguide 1 is contained in the second optical waveguide 2 as shown in FIG. 2. In other words, the joining portion x is configured in a double core shape in which the second optical waveguide 2 covers the entire circumference of the first optical waveguide 1.

Although the first port 10 is shown by a solid line in FIG. 2, the optical branching/coupling device A according to the present invention may be in an embodiment in which the first port 10 is connected to the end of the joining portion x, or in which the first port 10 may be omitted.

The cladding layer 3 covers the periphery of cores constituted by the first optical waveguide 1 and the second optical waveguide 2 over the entire length in the longitudinal direction.

The cladding layer 3 can be formed into, for example, a cylindrical shape, a prismatic shape, or any other three-dimensional shape according to the inner surface shape of a container 40 to be described later.

Next, the manufacturing method of the optical branching/coupling device A having the above structure will be described in detail.

In this manufacturing method, used are the first port 10, the second port 20 that is spaced apart from the first port 10 in the optical axis direction of the first port 10 (rightward in the illustrated example), the third port 30 arranged substantially in parallel with the second port 20 at an interval in a direction crossing the optical axis (downward in the illustrated example), and the container 40 that covers the space between the second port 20, the third port 30 and the first port 10 and covers the tip of each port on the space side are used.

The first port 10, second port 20, and third port 30 are optical fibers having different core diameters, respectively.

When the core diameter of the first port 10 is c1, the core diameter of the second port 20 is c2, and the core diameter of the third port 30 is c3, the following relational expression is preferably established.

$$c1 \geq c2 \geq c3$$

In particular, in the preferable aspect of the present embodiment, the relationship of the core diameters is as follows.

$$c1 = c2 > c3$$

The container 40 is formed in a hollow three-dimensional shape for making the outer surface shape of the cladding layer 3. The material of the container 40 may be a hard material such as a metal, a hard synthetic resin, ceramics, or glass, and a window or an opening for transmitting ultraviolet light may be provided as needed.

Through-holes (not shown) through which the ends of the second port 20 and the third port 30 are inserted are formed on one end side of the container 40.

A through hole (not shown) through which the end of the first port 10 is inserted is provided on the other end side of the container 40.

In addition, an opening (not shown) for filling the container 40 with the first to third photocuring resins and removing the uncured photocuring resin is provided on the wall portion of the container 40.

Figure 3:
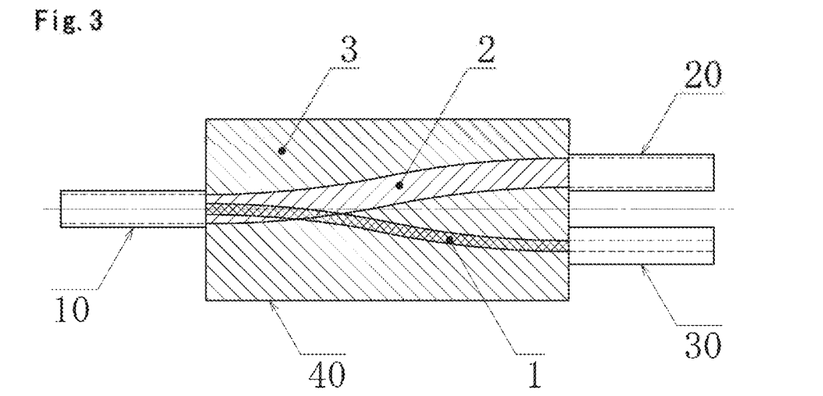
FIG. 3 is a schematic view showing an example of a method for manufacturing the optical branching/coupling device according to the present invention, in which a cladding layer is formed.

Here, in the present embodiment, the optical branching/coupling device shown in FIG. 3 is manufactured by a self-forming waveguide technique using three outgoing beams from optical fibers, and configuration of the coupler with low loss has become possible.

Figure 4:
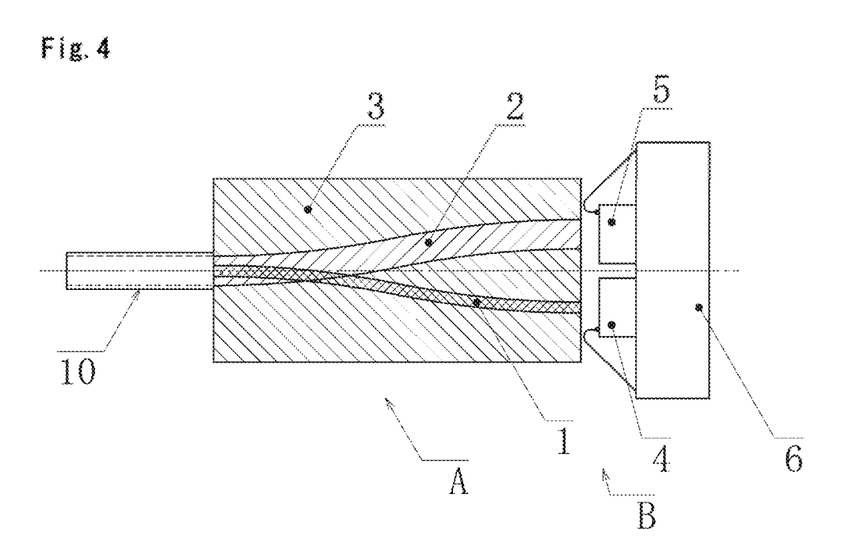
FIG. 4 is a side view showing an example of an optical transmission/reception module according to the present invention.

The optical branching/coupling device A having the above-described configuration constitutes an optical transmission/reception module B shown in FIG. 4, for example.

The illustrated transmission/reception module B is an optical transceiver provided with the optical branching/coupling device A connected to the first port 10, a light source unit 4 connected so as to allow the light to enter the end face on the one end side (right end side in the figure) of the first optical waveguide 1, a light receiving unit 5 connected so as to receive light from the end face on the one end side of the second optical waveguide 2, and a control circuit unit 6.

The light source unit 4 is a light source device having a light emitting diode, a laser diode, or the like.

The light receiving unit 5 is a light receiving device having a photodiode, a phototransistor, or the like.

The light source unit 4 and the light receiving unit 5 are integrally supported by the control board 6.

The control board 6 is an electronic circuit board having a circuit for converting an electric signal input from the outside into an optical signal and emitting the optical signal from the light source unit 4 to the first optical waveguide 1 and a circuit for converting an optical signal received from the second optical waveguide 2 into an electric signal and outputting the signal to the outside.

Next, the performance evaluation experiment of the optical branching/coupling device A and the transmission/reception module B described above will be described.

In this experiment, the transmission/reception module B was connected to each end of an SI type 200/230 μm multi-mode fiber having a length of 15 meter, and two transmission/reception modules B and B facing each other were used to perform 1 Gbps single-conductor bidirectional communication, and an eye-pattern analysis was conducted using a bit-error-rate tester (N4903A manufactured by Agilent Technologies, Inc. (currently Keysight Technologies, Inc.)).

Figure 5:
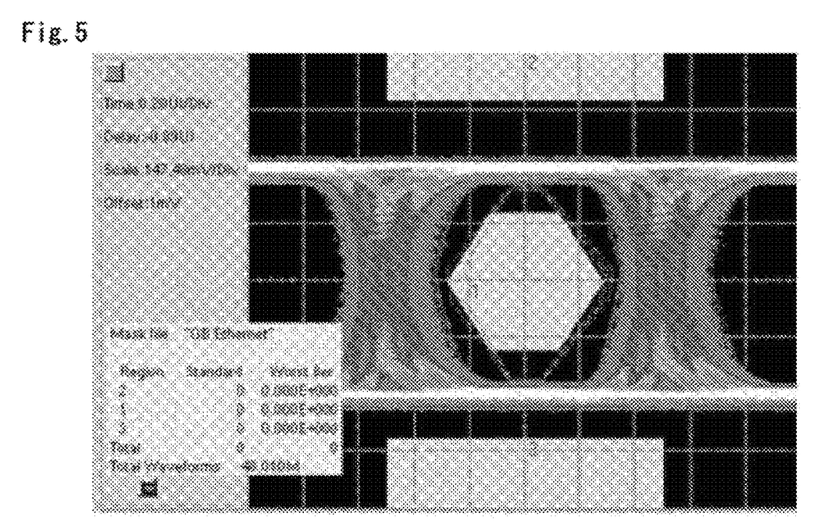
FIG. 5 shows an eye-pattern measurement image when the optical transmission/reception module according to the present invention is used.

FIG. 5 shows an image of the eye pattern at the time of using the transmission/reception module B having the optical branching/coupling device A described above. This eye-pattern image shows that a plurality of waveforms are overlapped with each other at the same position (timing and voltage), and that the optical transmission quality is satisfactory.

In other words, as a result of intensive research, the inventors of the present invention have found that the deterioration of the optical transmission quality due to mutual influence of the first optical waveguide 1 and the second optical waveguide 2 can be suppressed by making the refractive index of the second optical waveguide 2 smaller than the refractive index of the first optical waveguide 1, making the first optical waveguide 1 narrower than the second optical waveguide 2, or the like, thereby completing the present invention.

The optical branching/coupling device A of the present embodiment can reduce the angle between the first optical waveguide 1 and the second optical waveguide 2 to about 0 to 10°, for example, and even in this case, the above-mentioned high optical transmission quality can be obtained. Thus, the overall thickness of the optical branching/coupling device A can be reduced by reducing the size in the optical crossing direction.

The above-described optical branching/coupling device A is particularly suitable for forming a pair of bidirectional communication devices, and high-speed communication of gigabit class can be performed in a filterless system.

According to the above-mentioned optical branching/coupling device A, the cladding layer 3 made of a photocuring resin is provided thereon. However, as another example, the surrounding gas, liquid (for example, air, water, etc.) can be used as the cladding layer without using the cladding layer 3 of the photocuring resin.

In an example shown in FIG. 2, as particularly preferable aspect, the outer diameter c2 of the second optical waveguide 2 is set to be substantially the same as the core diameter c1 of the first port 10. However, the outer diameter c2 can be made smaller than the core diameter c1, as another example.

In addition, in the above-described optical branching/coupling device A, the first port 10 is an optical fiber having a single core and a single clad, but as another preferable example, the first port 10 may be an optical fiber having a double clad structure including a core close to the center, a first clad covering the periphery of the core and a second clad covering the periphery of the first clad.

In an example other than these, the core diameter of the first port 10 is set to be equal to or larger than the outer diameter of the first optical waveguide 1, and the first optical waveguide 1 is joined to the core of the first port 10.

The outer diameter of the first clad of the first port 10 is set to be equal to or larger than the outer diameter of the second optical waveguide 2 and the second optical waveguide 2 is joined to the first clad portion of the first port 10 so as to cover the first optical waveguide 1 on the other end side.

Further, the present invention is not limited to the above-described embodiments, and can be appropriately modified within the scope not changing the gist of the present invention.

REFERENCE SIGNS LIST

1: first optical waveguide
2: second optical waveguide
3: cladding layer
4: light source unit
5: light receiving unit
10: first port
20: second port
30: third port
40: container
A: optical branching/coupling device
B: transmission/reception module
x: joining portion

The invention claimed is:

1. An optical branching/coupling device comprising:
   a first optical waveguide extending from one end to another end opposite to the one end;
   a second optical waveguide extending from said one end to said another end,
   a joining portion in which the first optical waveguide is joined to and extends inside the second optical waveguide,
   a branched portion in which the first optical waveguide located in the second optical waveguide is branched off and separately extends from the second optical waveguide; and
   a cladding layer covering peripheries of the first optical waveguide and the second optical waveguide, wherein
   the first and second optical waveguides are cured products of a same photocuring resin.

2. An optical branching/coupling device comprising:
   a first optical waveguide extending from one end to another end opposite to the one end;
   a second optical waveguide extending from said one end to said another end through,
   a joining portion in which the first optical waveguide is joined to and extends inside the second optical waveguide; and
   a cladding layer covering peripheries of the first optical waveguide and the second optical waveguide, wherein the first optical waveguide is a cured product of a first photocuring resin, the second optical waveguide is a cured product of a second photocuring resin different from the first photocuring resin, a refractive index of the second optical waveguide is smaller than a refractive index of the first optical waveguide, and a refractive index of the cladding layer is smaller than the refractive index of the second optical waveguide.

3. The optical branching/coupling device according to claim 1, wherein a diameter of the first optical waveguide is smaller than a diameter of the second optical waveguide.

4. The optical branching/coupling device according to claim 3, wherein the first optical waveguide is circumferentially covered in the second optical waveguide at a side of the other end.

5. An optical transmission/reception module comprising:
   the optical branching/coupling device according to claim 1;
   a light source unit connected to the device and emitting light to enter from the one end of the first optical waveguide of the device; and
   a light receiving unit connected to the device and receiving the light from the one end of the second optical waveguide.

6. The optical branching/coupling device according to claim 2, wherein a diameter of the first optical waveguide is smaller than a diameter of the second optical waveguide.

7. The optical branching/coupling device according to claim 6, wherein the first optical waveguide is circumferentially covered in the second optical waveguide on the other end side.

8. An optical transmission/reception module comprising:
   the optical branching/coupling device according to claim 2;
   a light source unit connected to the device and emitting light to enter from the one end of the first optical waveguide of the device; and
   a light receiving unit connected to the device and receiving the light from the one end of the second optical waveguide.

9. The optical branching/coupling device according to claim 1, wherein the first optical waveguide and the second optical waveguide continuously extend between the one end and the other end, respectively, and
   the joining portion is formed in a double core shape in which the second optical waveguide covers an entire circumference of the first optical waveguide.

10. The optical branching/coupling device according to claim 2, wherein the first optical waveguide and the second optical waveguide continuously extend between the one end and the other end, respectively, and
    the joining portion is formed in a double core shape in which the second optical waveguide covers an entire circumference of the first optical waveguide.

* * * * *